(12) United States Patent
Moskovitz et al.

(10) Patent No.: US 8,554,832 B1
(45) Date of Patent: Oct. 8, 2013

(54) SERVER SIDE USER INTERFACE SIMULATION

(75) Inventors: Dustin Moskovitz, San Francisco, CA (US); Justin Rosenstein, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 12/932,671

(22) Filed: Mar. 1, 2011

(51) Int. Cl.
*G06F 15/16* (2006.01)

(52) U.S. Cl.
USPC ............ 709/203; 709/223; 709/232; 370/411

(58) Field of Classification Search
USPC .................................. 709/203, 223; 370/411
See application file for complete search history.

(56) References Cited

U.S. PATENT DOCUMENTS

| | | | | |
|---|---|---|---|---|
| 5,537,551 A | * | 7/1996 | Denenberg et al. ............ | 709/247 |
| 5,632,030 A | * | 5/1997 | Takano et al. ................. | 345/522 |
| 6,631,407 B1 | * | 10/2003 | Mukaiyama et al. .......... | 709/223 |
| 7,710,988 B1 | * | 5/2010 | Tripathi et al. ................ | 370/411 |
| 8,082,357 B2 | * | 12/2011 | Rock et al. ..................... | 709/232 |
| 2002/0188672 A1 | * | 12/2002 | Janssen et al. ................. | 709/203 |
| 2004/0029092 A1 | * | 2/2004 | Orr et al. ........................ | 434/354 |
| 2004/0135805 A1 | * | 7/2004 | Gottsacker et al. ........... | 345/751 |
| 2005/0108663 A1 | * | 5/2005 | Bentley et al. ..................... | 716/1 |
| 2006/0066595 A1 | * | 3/2006 | Sampsell et al. ............... | 345/204 |
| 2006/0085676 A1 | * | 4/2006 | Kobayashi et al. .............. | 714/10 |
| 2007/0094289 A1 | * | 4/2007 | Vandersluis .................... | 707/101 |
| 2007/0136804 A1 | * | 6/2007 | Ohsawa et al. .................. | 726/14 |
| 2007/0186144 A1 | * | 8/2007 | Stange et al. .................. | 715/500 |
| 2011/0081075 A1 | * | 4/2011 | Adcock et al. ................ | 382/165 |

* cited by examiner

*Primary Examiner* — Wing F Chan
*Assistant Examiner* — Tesfay Yohannes
(74) *Attorney, Agent, or Firm* — Schwegman Lundberg & Woessner, P.A.

(57) ABSTRACT

A method is provided that comprises running a screen display process on a client machine; in response to the running the screen display process on the client machine, running the screen display process on a server machine; sending over a network to the client machine at least a portion of the data required by the screen display process running on the server machine; and using by the screen display process running on the client machine at least a portion of the sent over data while running the screen display process on the client machine.

21 Claims, 6 Drawing Sheets

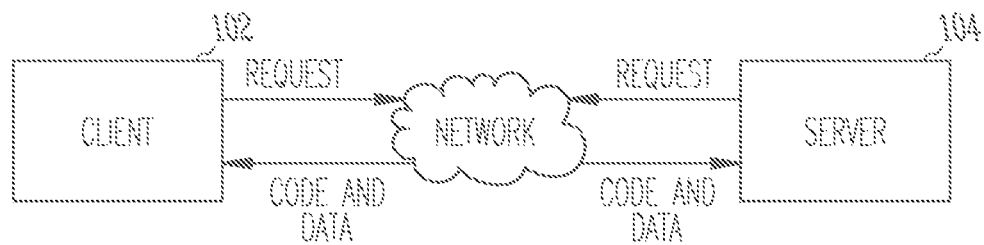
Fig. 1A
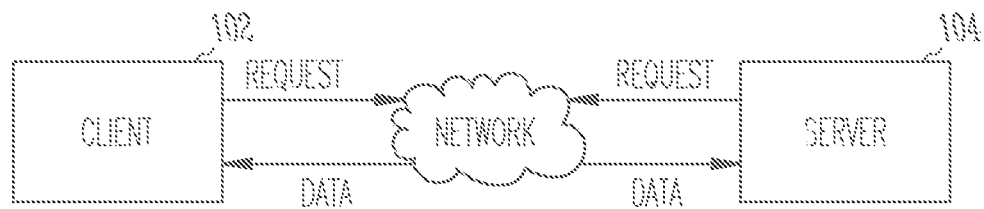
Fig. 1B
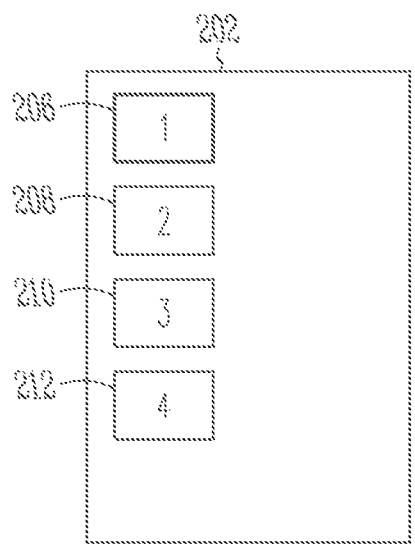 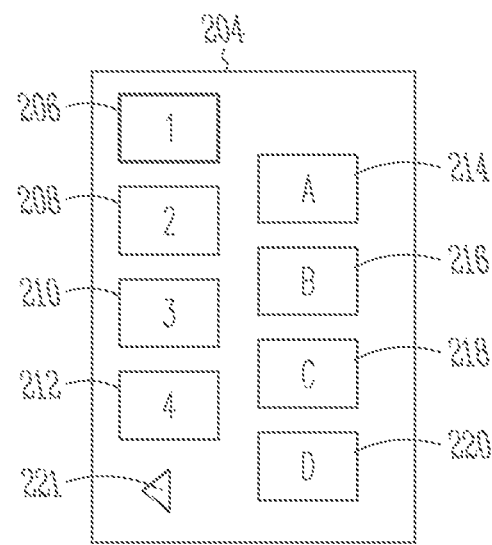
Fig. 2A                                   Fig. 2B

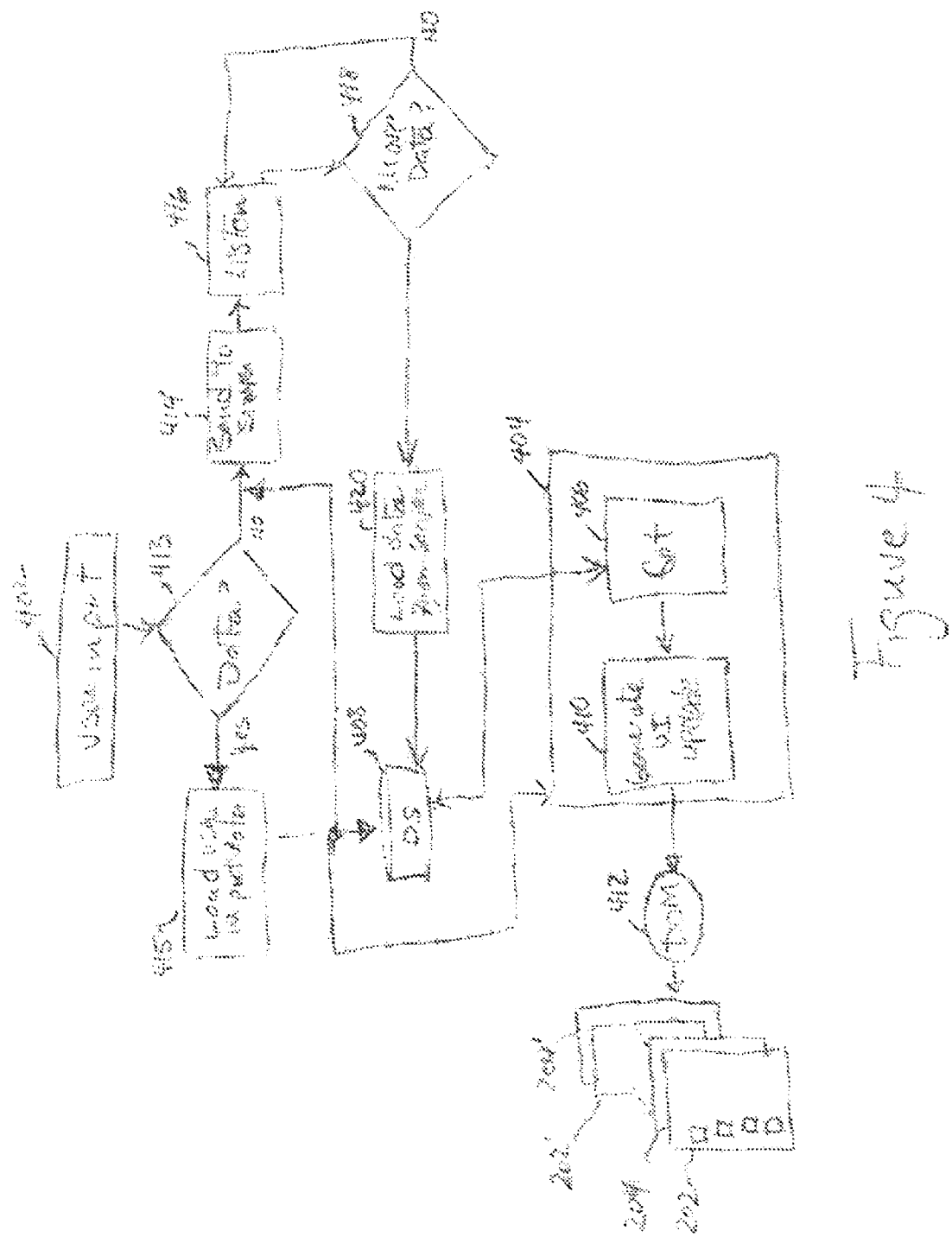

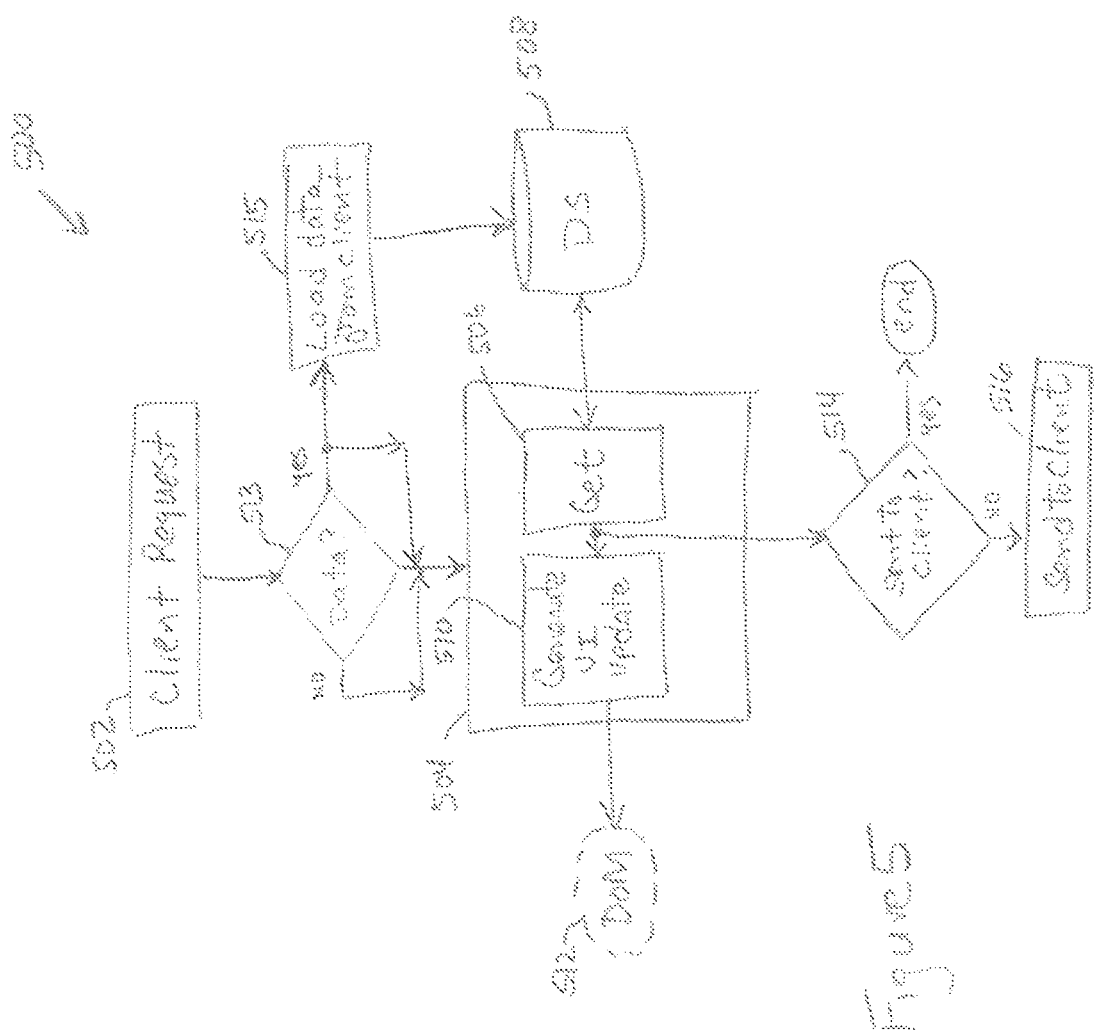

SERVER SIDE USER INTERFACE SIMULATION

BACKGROUND

A server, such as a web server, may deliver program code and data to a client machine. The program code may include JavaScript code. The client machine uses a Browser program to run the JavaScript code and to use the data to a user interface screen display on the client machine. It may not be practical for the server to deliver all of the data that the client machine might request or require before the data actually is needed to produce a complete screen display. Thus, from time to time the client machine may request additional data from the server.

SUMMARY

In some embodiments, a user interface screen display process runs on server machine in response to running the user interface screen display process on a client machine. A process running on the server machine determines what data is required by the user interface screen display process running on the server machine and sends at least a portion of that data to the client machine. The user interface screen display process running on the client machine uses at least a portion of the data sent by the server machine that was not stored in association with the client machine when the user interface screen display process began to run on the client machine.

BRIEF DESCRIPTION OF THE DRAWINGS

FIGS. 1A-1B are illustrative block diagrams showing communications between a client machine and a server machine in accordance with some embodiments.

FIGS. 2A-2B are illustrative drawings representing the first user interface display screen of the client that includes multiple interactive display elements and representing a second user interface display screen of the client generated in response to selection of one of the interactive elements of the first screen.

FIG. 4 is an illustrative block diagram of a client side process to create or update a user interface element on a user interface screen in accordance with some embodiments.

FIG. 5 is an illustrative block diagram of a server side process to determine what if any data values to send to a client machine that are needed by the client machine to create a user interface element on a client machine user interface screen display in accordance with some embodiments.

DESCRIPTION OF THE EMBODIMENTS

Figure 3A:
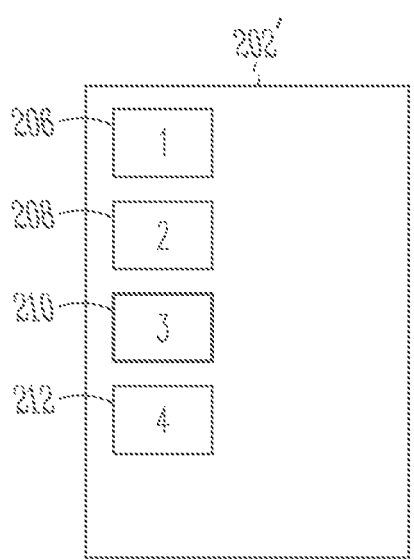
FIGS. 3A-3B are illustrative drawings representing the first user interface display screen of the client in which a different interactive display element 210 has been selected and representing the second user interface display screen of the client in which the display elements display data values that are associated with the selected display element.

Example methods and systems for supporting incremental computing are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in an inclusive and exclusive sense. Items that appear in multiple drawings are labeled with identical reference numerals in each drawing.

FIGS. 1A-1B are illustrative block diagrams showing communications between a client machine 102 and a server machine 104 in accordance with some embodiments. During a first communication phase, represented by FIG. 1A, the client 102 makes a request over a network that includes the Internet 103 to the server 104, and the server responds by sending application code to the client to render HTML information to generate a web page. During a second communication phase represented by FIG. 1B, the client 102 running the application code sends one or more requests over the network 103 to the server 104, and in response, the server sends data to the client for use by the application code in rendering one or more web pages or web page updates. The data may represent values or information presented within fields displayed on the web page or may represent one or more icons, images, animations or video displayed on the web page or may represent audio that is played in association with the web page, for example. Moreover, the data may also simply be part of the content of the page; there do not have to be actual formal "fields" present to display the information.

When a client makes its initial request, this creates a new 'session' which refers to a series of consecutive requests, such as that represented by FIG. 1B, from the client 102 to the server 104. Each session typically is associated with some unique identifier, such as a number or an alphanumeric value that the client 102 and the server 104 agree upon. In some embodiments, the server 104 selects the unique identifier and sends that identifier in its response to the initial request received from the client 102. In each subsequent request during a given session, the client sends that identifier as part of the request.

It will be appreciated that scalable web architectures rarely have client machines connecting directly to a server running the business logic that determines the web page to be displayed by a client machine. Ordinarily, there is a proxy server (not shown) operatively coupled between the client machine 102 and the server machine 104 that determines which actual server to send a client request to (often for load-balancing purposes). One way in which a proxy server can route a client request to the same server that handled an initial request, for example, is for the proxy server to create a map from a session identifier to the server that is handling that session.

In general, the lifetime of a session is arbitrary. The client 102 can either explicitly request to create a new session, or such request to create a new session can be implicit in the event that a client request lacks information about an existing session. The server that originally responds to an initial client request also can use the 'keep-alive' aspect of the HTTP protocol to keep a session with an initially requesting client machine alive.

FIGS. 2A-2B are illustrative drawings representing the first user interface display screen 202 of the client 102 that includes multiple interactive display elements 206-212 and representing a second user interface display screen 204 of the client generated in response to selection of one of the interactive elements of the first screen 202. The first screen 202 provides a menu of interactive display elements 206-212 that display data values 1-4. Display element 206, which displays the data value "1", is shown highlighted in FIGS. 2A-2B to indicate that it has been selected by a user. The second user interface screen 204 also includes displays elements 214-220 that display data values A-D that are associated with the selected first display element 206.

Figure 3B:
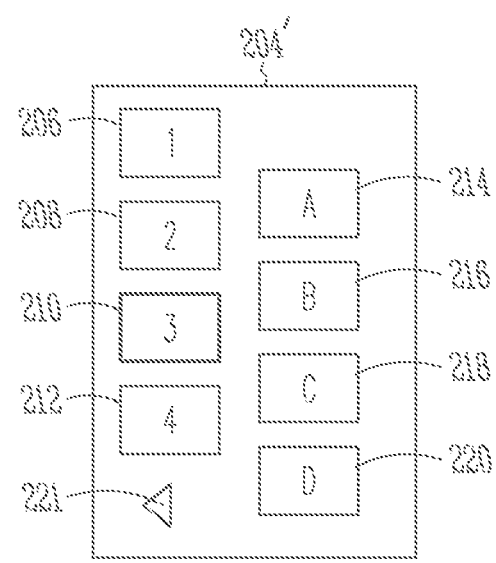

FIGS. 3A-3B are illustrative drawings representing the first user interface display screen 202' of the client 102 in which a different interactive display element 210 has been selected and representing the second user interface display screen 204' of the client 102 in which the display elements 214-220 display data values that are associated with the selected display element. Display element 210, which displays the data value "3", is shown highlighted in FIGS. 3A-3B to indicate that it has been selected by a user. The second user interface screen 204' also includes displays data values A, E, C, F in respective display elements 214-220 that are associated with the selected display element 210.

FIG. 4 is an illustrative block diagram of a client side process 400 to create or update a user interface element on a user interface screen in accordance with some embodiments. The client side process itself is known and has been used in the past. The process 400 is implemented with computer program code, and modules within the flow diagrams represents configuration of a processor on a client machine, such as machine 102 in FIGS. 1A-1B, to implement the act specified for the module. Module 402 receives user interface (UI) input such as a mouse click, keyboard entry, touch screen entry, voice command or other user interface element, for example. The user input acts as a request to present information through the UI. The request may comprise data input such as a user's home or business address or a search request information that is presented by the UI as the user enters it, for example. The request may comprise a command such as to proceed with checkout in an online sales context, for example. The request may comprise data that also acts as a command such as search data that automatically generates search results in response to the user-entered search data.

Rendering module 404 receives the UI input, the request, and renders one or more display elements for display on a UI screen display such as the displays of FIGS. 1A-1B and FIGS. 2A-2B, for example. In some embodiments, module 404 is implemented using the JavaScript language and is downloaded from the server 104 during the first communication phase represented by FIG. 1A. Module 404 includes a 'Get' module 406 to obtain data values from a client data store 408 associated with the client machine 102. Module 404 also includes a Generate Update module 410 that obtains the data values from the Get module 406 and uses a document object model (DOM) 412 associated with the client machine 102 to produce a sequence of one or more visible user interface screen displays such as 202, 204, 202' and 204' that include display elements in the in response to a sequence of one or more requests received by module 402. It will be appreciated that the DOM 412 acts as an interface and is produced by the client browser application. Decision module 413 determines whether the request includes data. When decision module 413 determines that the request contains data, module 415 stores the data in the client data store 408. Whether the request includes data or does not include data, module 414 sends the request to the server 104. When the request contains data, then the server stores the data in a server data store, discussed below, that corresponds to the client machine.

The data provided to the client data store 415 is retrieved by the Get module 406 for use by the Generate Update module 404 to update the screen display to show the user entered data. For example, a user may enter personal information such as zip code into a field on the client machine screen display that corresponds to a display element of the DOM 412. Module 415 causes storage of the user entered data in the client data store 408; whereupon the Get module 406 retrieves the user entered data from the client data store 408 for use by the Generate Update module 410 to display the data on the screen display.

In addition, a user may make a request to the server based upon data entered by the user into the client data store 408. For example, a user may enter zip code information into a field on a client machine screen display and then make a request to display a list of stores located within a geographic region that corresponds to the zip code. Thus, the request depends upon user-entered data.

Module 416 listens for data values returned by the server in response to the message sent by module 414. Module 416 may wait for an 'acknowledge' signal and will wait for a prescribed time interval for additional data values, which may or may not be sent by the server 104. It will be understood that in most cases, the server will attempt to respond to the client with an acknowledgment. Examples of situations in which there is no acknowledgment received from the server includes cases of a defect, error, or timeout (server just takes too long), in which case the client will retry the request. The Decision module 418 determines whether the server has sent additional data values. If no, then module 416 continues to listen during the prescribed time interval. If yes, then module 420 loads the additional data values sent by the server into the data store 408. Once the additional data values are obtained from the server, module 404 is invoked again to render those values into the screen display.

In operation, the client data store 408 may not have all of the data values required to generate an updated display element in response to a user request received by user input module 402. For example, the client data store 408 may have some but not all of the required data values. In that case, the Get module 406 obtains the required data values that the data store 408 already does have, and the Generate Update module 410 uses the DOM 412 to generate as much of the update as possible with the data values currently available in the data store 408.

In some embodiments, when the client data store 408 is missing some data required for the display of one or more elements, the Get module 406 returns a special value indicating that the data value currently is unknown and does not immediately retry to get that missing data value at that time. Instead, the Generate Update module 410 uses the special value in deciding what UI elements to render (for example, an indicator, e.g. "Loading . . . " to the user that information is pending receipt from the server). Alternatively, for example, the Generate Update module 406 may not create an indicator corresponding to every missing value. Rather, the Generate Update module 410 may be made aware of what values are missing and can use that logic in deciding what to display and whether to even bother to display an element corresponding to a missing data value. Thus, it will be appreciated that there may not be a one-to-one correspondence between data values (missing or not) and display elements. Later, when a missing data value arrives from the server and module 420 loads the value into the client data store 408, the Get module 406 retrieves the missing data value and provides it to the Generate Update module 404, which uses the DOM 412 to display the received data value in the appropriate screen display element.

In some embodiments, the client may continue to make changes locally to the client data store 408 and to the client screen display while a request sent to the server via module 414 is in-flight. The client machine 102 keeps track of the last change the server has acknowledged. When module 414 sends a request to the server, that request includes all of the changes to the client data store 408 that have been made since the last change the server acknowledged. This idea of keeping a 'last change acknowledged' in a sync protocol through such a pipeline of changes is known and not novel.

Ordinarily, sending requests to the same server that originally participated in first phase communications contributes to efficiency, but a client-server system built to be fault-tolerant can handle if that same server has a problem, because all of the session state is stored in the database on the server. So a different server can readily read the session information from the database and use that state when running the code. That different server will be in the same state that the previous server was in before the latest request. The different server then can process the client requests and provide responses to the client that are equivalent to what the original server would have sent.

FIG. 5 is an illustrative block diagram of a server side process 500 to determine what if any data values to send to a client machine that are needed by the client machine to create a user interface element on a client machine user interface screen display in accordance with some embodiments. The process 500 is implemented with computer program code, and modules of the flow diagrams represents configuration of a processor on a client machine, such as machine 104 in FIGS. 1A-1B, to implement the act specified for the module.

Module 502 receives the client request sent by module 414 of the client machine 102. Decision module 513 determines whether the request includes data. When decision module 513 determines that the request contains data, the request is sent to rendering module 504 and the request data is sent to module 515, which loads the data from the request into server data store 508. When decision module 513 determines that the request does not contain data, the request is sent to rendering module 504.

In some embodiments, module 515 is configured to perform evaluation and validation of the data and possible rejection of changes. For example, a client machine may attempt to load erroneous or malicious data. Such evaluation process protects against such occurrences.

Module 504 running on the server 104 operates as if it was rendering the same one or more display elements for display on a UI screen display that are rendered by module 404 of the client machine 102. Module 504 includes a 'Get' module 506 to obtain data values from a data store 508 associated with the server machine. Module 504 also includes a Generate Update module 510 that obtains the data values from the Get module 506 and uses a dummy document object model (DOM) 512 associated with the server machine 104 to go through the computations required to produce a display element in response to the message received by module 502 on the server.

In some embodiments, a "dummy DOM" is used so that the Generate Update module 510 does not need additional code to make a different decision based on whether it is a client or server each time it wants to 'render' a portion of the UI. It will be appreciated that a "dummy DOM" does not exist per se, but could be a name for a module that presents the same interface as an actual DOM but is implemented to do as little as possible instead of what a real DOM module does, which is to create a hierarchical representation of a document inside a document viewing process (i.e. a browser).

Decision process 514 determines whether data values retrieved from the server data store 514 actually have been sent to the client already during the first phase communication of FIG. 1A, for example, or during any subsequent communication in which the server sent data to the client. Basically, the server is just keeping track of what values it has sent to the client so it only has to send new values, changed values, or values that are no longer needed.

If no, then module 516 sends to the client the data values that the client has not yet received from the server. Alternatively, in some embodiments, decision module 514 is omitted, and the server uses module 516 to send the entire collection of data values needed to render the one or more display elements to be displayed on a client machine display screen. In either case, the client module 416 receives the data values and module 420 loads the received data values to the client data store 508 so that the client can complete the rendering of the one or more display elements in response to the input received by module 402.

Figure 6:
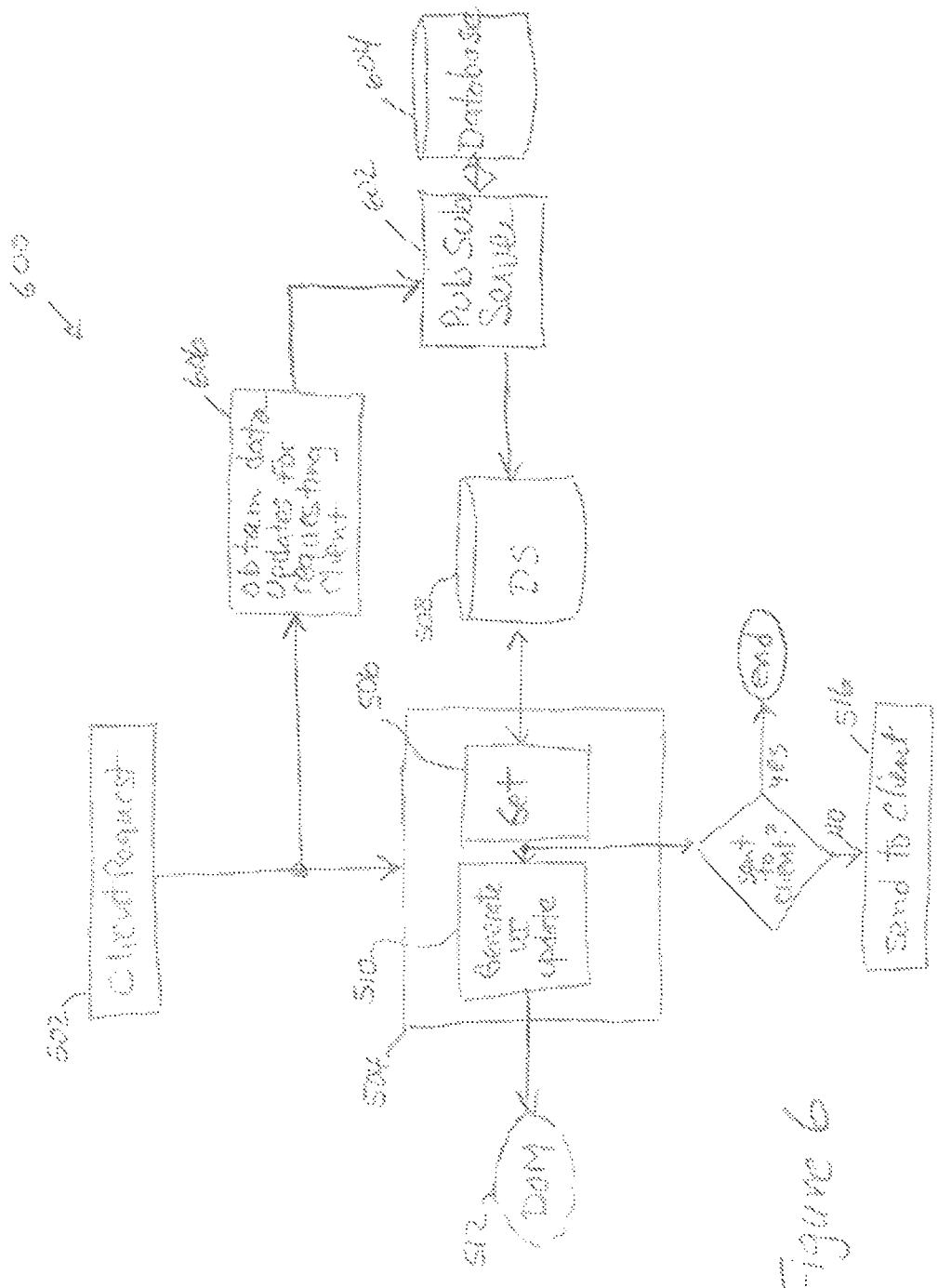
FIG. 6 is an illustrative block diagram of an alternative server side process to determine what if any data values to send to a client machine that are needed by the client machine to create a user interface element on a client machine user interface screen display in accordance with some embodiments.

FIG. 6 is an illustrative block diagram of an alternative server side process 600 to determine what if any data values to send to a client machine that are needed by the client machine to create a user interface element on a client machine user interface screen display in accordance with some embodiments. In the alternative embodiment 600, the server 104 learns of changes to the client data store 408 or to the server data store 408 from sources other than the client 102. Essentially, the server can learn of changes to either or both the client data store (as part of the client request) or go through the process you describe to learn about a change to its own data store. In particular, a publication/subscriber ("pub-sub") server 602 handles subscription to and publication of changes in database 604 that contains data values used to render user interface display of the client machine 102. Whenever the server 104 receives a request from the client 102, module 606 contacts the pub-sub server 602 to poll for any changes to the database 604 pertaining to that client 102. New or modified data values returned by the pub-sub server 602 are stored in the server's own data store 508. Alternatively, a simpler, but slower, process for the server 104 to update its data store 508 is to make a query or a series of queries to the pub-sub server 602 to find out which of the data values it cares about have changed since the last client request.

Additionally, in other alternative embodiments, a third party other than the client machine 102 can change values in the database 604 that pertain to the client 102. The client 102 does not need to have a knowledge of or direct interaction with a third party. Rather, the client receives the information that it needs to obtain directly from the server. From the perspective of a server servicing a single client, another server servicing another client might appear as a third party. Each makes changes to the database in response to client actions. But another example would be a tool (e.g. a customer service tool) that is run to change the data in some way that an 'application' does not provide a mechanism for.

As used in the above example, an 'application' refers to a collection of code running in the server and client processes. An 'instance' of that application would be the collection of processes on the server and client that pertain to a specific session. Many instances of the application may be running at once. So one could imagine that a one instance of the application may change some of the same data that another instance of the same application changes. A tool to help customer service operators access user data might be an example of such tool.

Also, it will be noted that, for example, a server may learn of changes both from a client and from a third party (via the pub-sub mechanism). The server includes logic for "merging" these changes. Sometimes the changes are independent and will not conflict. But sometimes they might conflict—the client may have changed the same data value as a third party.

There are varying strategies to handle such conflicts, which will be readily understood by persons skilled in the art and which form no part of the present invention. One example is to track the time at which the client made the request and the time the third party made the request (perhaps by always storing it with the data value), and comparing them, then accepting the latest value. Another example is to reject the client change and inform the user that a value they modified has changed in the meantime and they need to re-attempt the change.

Rendering Code Example

Table 1 is an illustrative example of JavaScript code that can be used in an example Generate Update modules 410 or 510. The "getV" function called on an object, naming a property of that object, is an example of calling into the Get modules 406 or 506 to read data about that object from the data store 408 or 508.

TABLE 1

```
// Creates and returns a list of DIV elements, one for each task in the
provided task list.
// Each DIV contains the name of the task and, if the task is the one the user
has selected, the long description of the task.
renderAllTasks(session, task_list) {
    return task_list.map(function(task) {
        return createNode('DIV', [
            createNode('DIV',[task.getV('name')],
                session.getV('selected_task') = task
                ? task.getV('description')
                    ? task.getV('description')
                    :''
        ]);
    });
}
```

The code of Table 1 configures a processor, both a client computer's processor and server computer's processor in accordance with principles described herein, to achieve the following User Interface behavior. Assume, for example, that a simple task list application in which a list of tasks is to be displayed on a computer screen display for a user to view. Assume further that each task has a name and a long description associated with it. The list is displayed by showing each task's name, in order. Controls exist for the user to 'select' a task. The screen display will show the selected task's long description as well as its name. Only the description for the selected task will be shown. The description for all other non-selected tasks will be hidden.

Suppose, for example, we want to use the JavaScript module of Table 1 running in a browser on a client and on a server to render the above-described display (function "renderAllTasks" in Table 1). The module will first have to access to the list of tasks to be rendered (the "task_list" parameter), and some representation for which task is selected (which may be a "selected_task" property of the "session" parameter). It will then iterate over the task list. For each task, it will create a "container" node to hold the display information for tht task (first call to "createNode"). The module will then retrieve that task's name ("task.getV('name')"). Once the name is retrieved, the module will call upon the DOM to create a new display element with the task's name as it's contents. (the second call to the "createNODE"). The module then will compare the task to the module's notion of which task is selected ("session.getV('selected_task')==task)"). If the task is the selected task, the module will fetch the task's long description ("task.getV('description')"). The node containing the task name and, if created, the text description will then both be added as children of the container node.

It will be understood that the JavaScript module of Table 1 runs on the client machine 102 within module 404 shown in FIG. 4 and runs on the server machine 104 within module 504 shown in FIGS. 5-6. In the course of running the JavaScript module of Table 1, on the client machine 102, the module running on the client attempts to fetch the task's long description ("task.getV('description')") from the client machine data store 408. In the course of running the JavaScript module of Table 1, on the server machine 104, the module running on the server also attempts to fetch the task's long description ("task.getV('description')") from the server machine data store 508. If the client data store 408 contains the long description, for example, then the JavaScript module of Table 1 adds the long description as a child of the container node without delay attendant to its delivery by the server 104. If on the other hand, the client data store 408 does not contain the long description, for example, then the JavaScript module of Table 1 adds the long description as a child of the container node after it has been retrieved from the server data store 508 and has been loaded to the client data store 408.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
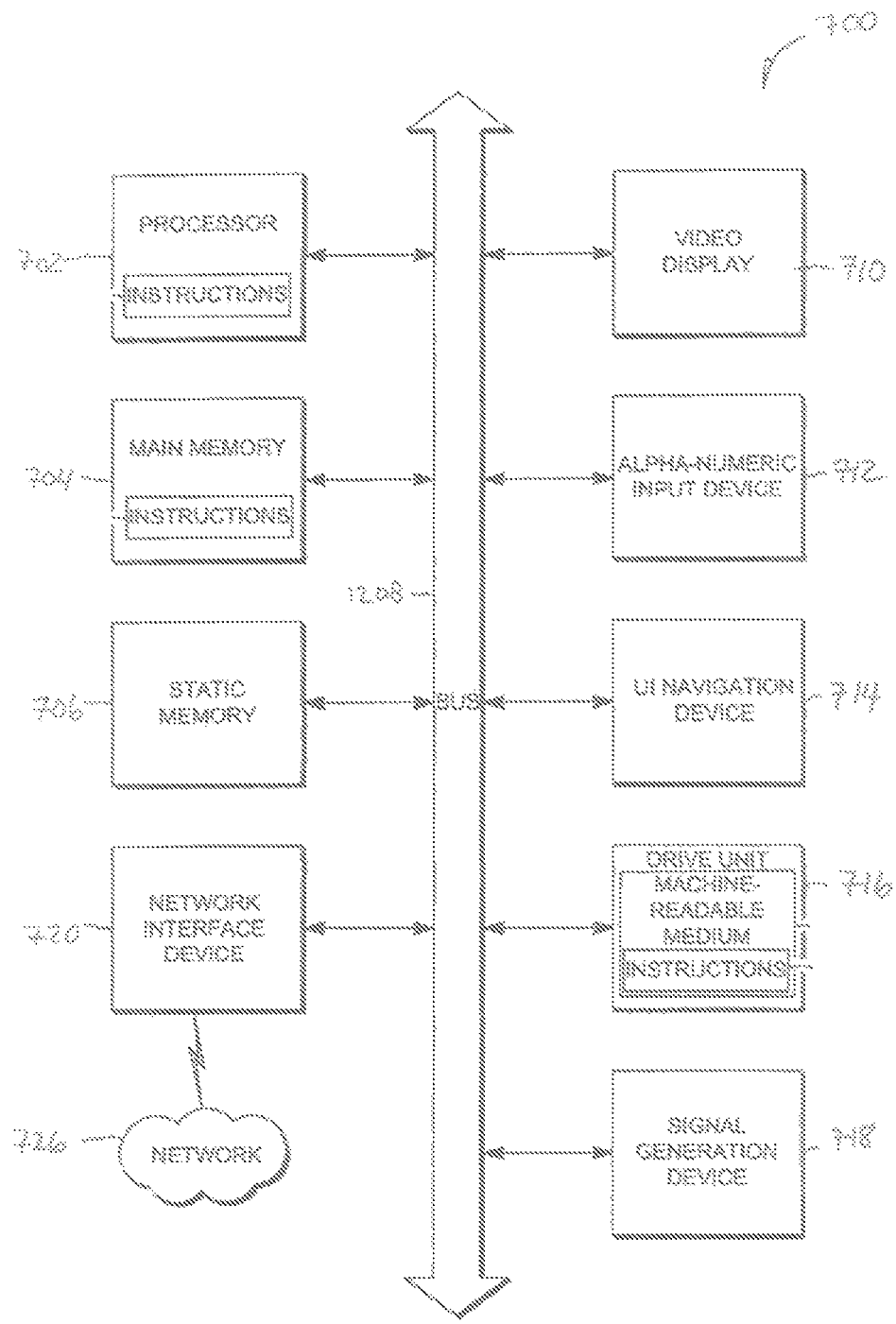
FIG. 7 is a block diagram of machine in the example form of a computer system 700 within which instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
   receiving a user input on a client machine, wherein the client machine includes a client machine interface used to produce a screen display;
   in response to the user input, running a screen display process on the client machine, wherein the screen display screen process running on the client machine includes storing data included in the received user input in a client data store and sending the user input over a network to a server machine, listening on the network for data sent by the server in response to the user input, and storing data received from the server in the client data store, and configuring the client machine to perform a rendering process that uses the user input including data stored in the client data store to create an update display element within the client machine interface;
   in response to the user input sent by the client machine, running a screen display process on the server machine that includes configuring the server machine to perform a rendering process to perform computations to create the update display element in response to the user input;
   in the course of running the rendering process on the server, determining by the server, data required by the rendering process running on the server that also are required by the rendering process running on the client machine that the client machine does not have;
   sending over the network from the server machine to the client machine at least a portion of the data determined to be required by the rendering process running on the server machine that the client machine does not have;
   using by the rendering process running on the client machine at least a portion of the sent over data to create an update display element within the client machine interface; and
   wherein substantially identical code is used to configure the client machine to run the rendering process on the client machine and to run the rendering process on the server machine.

2. The method of claim 1,
wherein the client machine interface includes a hierarchical representation of a document inside a viewing process.

3. The method of claim 1 further including:
during a first communication phase, sending by the client machine a request over the network to the server machine for information;
in response to the request, receiving code used to configure the client machine to run the rendering process; and
running the rendering process on the client machine to use the received data to generate the web page on the client machine;
wherein substantially identical code is used to configure the client machine to run the rendering process on the client machine and to run the rendering process on the server machine.

4. The method of claim 3,
wherein the act of receiving a user input on a client machine involves receiving a user input selection of a display element on a web page generated on the client machine using the rendering process.

5. The method of claim 1,
wherein the client machine interface includes a document object model (DOM)) used by a browser running on the client machine to produce a screen display.

6. The method of claim 5,
wherein the act of running the rendering process on the server machine involves using a dummy DOM to represent the DOM on the client machine.

7. The method of claim 1 further including:
during a first communication phase, sending by the client machine a request over the network to the server machine for information;
receiving by the client machine over the network from the server machine data for use to generate an web page;
running the rendering process on the client machine to use the received data to generate the web page on the client machine;
storing by the server an indication of what data has been sent by the server machine to the client machine;
wherein the act of receiving a user input occurs later, after the first phase; and
wherein the act of determining by the server machine involves using the indication of what data has been sent by the server machine to the client machine to determine data required by the rendering process running on the server machine that also are required by the rendering process running on the client machine that the client machine does not have.

8. The method of claim 1 further including:
during a first communication phase, sending by the client machine a request over the network to the server machine for information;
receiving by the client machine over the network from the server machine data to generate an web page;
receiving updates on the client machine to the data in the client data store;
receiving the updates on a publication server machine to the data in the client data store;
running the rendering process on the client machine to use the received data for use to generate the web page on the client machine;
wherein the acts of receiving the user input on the client machine, receiving the updates on the client machine and receiving the updates on the publication server occur later, after the first phase; and
wherein the act of determining by the server machine involves the server machine contacting the database publisher server machine to identify data the client machine has, to determine data required by the rendering process running on the server machine that also are required by the rendering process running on the client machine that the client machine does not have.

9. The method of claim 8 further including:
during the first communication phase,
storing by the server an indication of what data has been sent by the server machine to the client machine;
wherein the act of determining by the server machine involves the server machine contacting the database publisher server to identify data the client machine has and using the data identified by the publisher server machine and the stored indication of what data has been sent by the server machine to the client machine, to determine data required by the rendering process running on the server machine that also are required by the rendering process running on the client machine that the client machine does not have.

10. The method of claim 4,
wherein the web page includes an HTML web page.

11. A method comprising:
receiving on a server machine a request for information sent over a network from a client machine;
in response to the request, sending from the server machine over the network to the client machine code for use to configure the client machine to run a rendering process to generate the web page; and
using code that is substantially identical to the code sent from the server machine to the client machine to configure the server machine to run a rendering process;
receiving on a server machine user input to the web page sent over the network from the client machine;
in the course of running the rendering process on the server machine, determining by the server machine, data required by the rendering process running on the server machine that also are required by a rendering process running on the client machine that the client machine needs;
sending over the network from the server machine to the client machine at least a portion of the data determined to be required by the rendering process running on the server machine that the client machine needs; and
wherein substantially identical code is used to configure the client machine to run the rendering process on the client machine and to run the rendering process on the server machine.

12. The method of claim 11 further including:
storing by the server machine an indication of what data has been sent by the server machine to the client machine;
wherein the act of determining by the server machine involves using the indication of what data has been sent by the server machine to the client machine to determine data required by the rendering process running on the server machine that also are required by the rendering process running on the client machine that the client machine needs.

13. The method of claim 11,
wherein the act of determining by the server machine involves the server machine contacting a database publisher server machine to identify data the client machine has, to determine data required by the rendering process running on the server machine that also are required by the rendering process running on the client machine that the client machine needs.

14. The method of claim 11 further including:
storing by the server machine an indication of what data has been sent by the server machine to the client machine;
wherein the act of determining by the server machine involves the server machine contacting a database publisher server machine to identify data the client machine has and using the data identified by the publisher server machine and the stored indication of what data has been sent by the server machine to the client machine, to determine data required by the rendering process running on the server machine that also are required by the rendering process running on the client machine that the client machine needs.

15. The method of claim 11,
wherein determining by the server machine includes determining what data are required by a rendering process running on the client machine that the client machine needs but does not have.

16. An article of manufacture that includes a non-transitory computer readable storage device that stores computer readable code to configure a computer to implement a method comprising:
receiving a request for information sent over a network from a client machine;
in response to the request, sending over the network to the client machine code for use to configure the client machine to run a rendering process to generate the web page; and
using code that is substantially identical to the code sent to the client machine to configure a server computer to run a rendering process;
receiving user input to the web page sent over the network from the client machine;
in the course of running the rendering process on the server computer, determining data required by the rendering process running on the server computer that also are required by a rendering process running on the client machine that the client machine needs;
sending over the network from the server machine to the client machine at least a portion of the data determined to be required by the rendering process running on the server computer that the client machine needs; and
wherein substantially identical code is used to configure the client machine to run the rendering process on the client machine and to run the rendering process on the server machine.

17. The article of claim 16 further including:
storing by the server machine an indication of what data has been sent to the client machine;
wherein the act of determining involves using the indication of what data has been sent to the client machine to determine data required by the rendering process running on the server machine that also are required by the rendering process running on the client machine that the client machine does not have.

18. The method of claim 16,
wherein the act of determining involves the contacting a database publisher server machine to identify data the client machine has, to determine data required by the rendering process running on the server machine that also are required by the rendering process running on the client machine that the client machine does not have.

19. The method of claim 16 further including:
storing by the server machine an indication of what data has been sent to the client machine;
wherein the act of determining involves contacting a database publisher server machine to identify data the client machine has and using the data identified by the publisher server machine and the stored indication of what data has been sent to the client machine, to determine data required by the rendering process running on the server machine that also are required by the rendering process running on the client machine that the client machine does not have.

20. The article of claim 16,
wherein determining by the server machine includes determining what data are required by a rendering process running on the client machine that the client machine needs but does not have.

21. A system comprising:
at least one processor;
non-transitory machine readable storage device; and
a communication bus coupling the processor and the storage device;
wherein the storage device stores computer readable code to configure the at least one processor to implement a method comprising:
receiving a request for information sent over a network from a client machine;
in response to the request, sending over the network to the client machine code for use to configure the client machine to run a rendering process to generate the web page; and
using code that is substantially identical to the code sent to the client machine to configure the at least one processor to run a rendering process;
receiving user input to the web page sent over the network from the client machine;
in the course of running the rendering process on the at least one processor, determining data required by the rendering process running on the at least one processor that also are required by a rendering process running on the client machine that the client machine needs;
sending over the network to the client machine at least a portion of the data determined to be required by the rendering process running on the at least one processor that the client machine needs; and
wherein substantially identical code is used to configure the client machine to run the rendering process on the client machine and to run the rendering process on the server machine.

* * * * *

UNITED STATES PATENT AND TRADEMARK OFFICE
CERTIFICATE OF CORRECTION

PATENT NO. : 8,554,832 B1  
APPLICATION NO. : 12/932671  
DATED : October 8, 2013  
INVENTOR(S) : Moskovitz et al.

Page 1 of 1

It is certified that error appears in the above-identified patent and that said Letters Patent is hereby corrected as shown below:

In the Claims

In column 12, line 36, in Claim 1, after "play", delete "screen", therefor

In column 13, line 25, in Claim 5, delete "(DOM))" and insert --(DOM)--, therefor In column 13, line 36, in Claim 7, delete "an" and insert --a--, therefor In column 13, line 56, in Claim 8, delete "an" and insert --a--, therefor In column 13, line 62, in Claim 8, after "data", delete "for use", therefor In column 16, line 2, in Claim 18, delete "the" and insert --the server machine--, therefor (1$^{st}$ occurrence)

Signed and Sealed this  
Second Day of December, 2014

Michelle K. Lee  
*Deputy Director of the United States Patent and Trademark Office*